United States Patent [19]

Montgomery

[11] 3,925,134

[45] Dec. 9, 1975

[54] PROCESS FOR PREPARING SUPPORTED RIBBONS

[75] Inventor: Robert T. Montgomery, Matthews, N.C.

[73] Assignee: Celanese Corporation, Charlotte, N.C.

[22] Filed: July 5, 1973

[21] Appl. No.: 376,753

Related U.S. Application Data

[62] Division of Ser. No. 185,015, Sept. 30, 1971, Pat. No. 3,776,808.

[52] U.S. Cl. ............................... 156/178; 156/436
[51] Int. Cl.² ........................ B32B 5/08; B32B 7/04
[58] Field of Search .......... 156/178, 290, 436, 180; 206/51; 161/141, 143

[56] References Cited
UNITED STATES PATENTS

| | | |
|---|---|---|
| 1,610,776 | 12/1926 | Hardman ........................... 156/436 |
| 2,456,923 | 12/1948 | Cogovan ........................... 156/178 |
| 2,626,883 | 1/1953 | Boese ................................ 206/51 |
| 2,631,957 | 3/1953 | Francis ............................. 161/143 |
| 2,826,237 | 3/1958 | Carlson ............................ 156/436 |
| 2,985,995 | 5/1961 | Bunting et al. ..................... 57/157 |
| 3,388,030 | 6/1968 | Estes ................................ 156/180 |
| 3,409,493 | 11/1968 | McIntyre ........................... 156/180 |

*Primary Examiner*—Daniel J. Fritsch
*Attorney, Agent, or Firm*—Robert J. Blanke

[57] ABSTRACT

A process for the preparation of supported bulked ribbons having improved cover. The process involves the bonding of peripheral filaments of substantially parallel, substantially zero twist compacted continuous filament yarns to a support.

3 Claims, 3 Drawing Figures

3,925,134

PROCESS FOR PREPARING SUPPORTED RIBBONS

This invention, which is a Divisional application of copending Application Ser. No. 185,015, filed Sept. 30, 1971, now U.S. Pat. No. 3,776,808, relates to supported ribbons, and more specifically, to supported continuous filament decorative ribbons having high bulk and cover and aesthetically pleasing properties.

Continuous filament yarns are known to produce highly desirable ribbons, many of the ribbons being resistant to moisture and being suitable for being formulated into the bows and knots which are essential to ornamental packaging and floral arrangements. Ribbons of this nature have been disclosed in both self-supporting and supported form. Exemplary of prior art supported decorative ribbons are those ribbons set forth in U.S. Pat. No. 2,626,883 wherein a web of parallel cellulose acetate twisted yarns are bonded to a tissue-like, non-woven web composed of staple fibers at least some of which are thermoplastic, the bonding being accomplished by heat and pressure thereby causing fusion among all the thermoplastic fibers.

While the supported ribbons of the prior art are functional in their ability to form satisfactory bows and knots, none of the ribbons of the prior art have a bulked or three-dimensional effect; that is to say, the prior art ribbons are flat and almost film-like in their appearance due to the nature of the face yarns and the bonding operations necessary to secure the webs of parallel cellulose filament yarns. Moreover, the supported continuous filament ribbons of the prior art require excessive amounts of filament face yarns to cover the supporting substrate.

It is therefore an object of this invention to produce a continuous filament ribbon having a bulked or three-dimensional effect.

It is an additional object of this invention to produce a supported continuous filament ribbon having improved cover in the ribbon face yarns.

It is a further object of this invention to provide a process for the preparation of continuous filament ribbon having improved cover and bulk.

These and other objects of the invention will become more apparent from the following detailed description.

In accordance with this invention, it has now been discovered that a bulked or three-dimensional supported ribbon having improved face yarn cover may be produced by bonding a sheet comprising substantially parallel, substantially zero twist compacted continuous filament yarns to a support. The support may be film paper, woven scrim and non-woven scrim. The continuous filament yarn may be any of the well-known continuous filament yarns such as regenerated cellulose, cellulose esters, polyesters, polyamides, polypropylene, acrylics and vinyl continuous filament yarns. The preferred continuous filament yarn of this invention is cellulose acetate continuous filament yarn. Preferably the yarn has a total denier of from 100 to 400 and a denier per filament of from 2.5 to 7. The compacted yarn must have a mean centimeter pull (needle pull) of from 0.5 cm to 70 cm, the yarn being conveniently prepared according to the process set forth in U.S. Pat. No. 2,985,995, with coherency factors being determined according to the needle pull test set forth in U.S. Pat. No. 3,566,683. Bonding between yarn and support is a surface bonding of the peripheral filaments of the yarn bundle to the support, the non-bonded filaments being held in place by entanglement with the bonded filaments. The bonding process may be an adhesive bonding process, a thermal bonding process, a solvent bonding process, or any combination thereof, the limiting feature of the bonding process being the need to secure the peripheral filaments only of the yarn filament bundle to the support or substrate.

The word "bulked" as employed herein is meant to include a substantially parallel continuous filament yarn surface wherein the yarn bundle has a substantial number of finite lengths of free or unsecured filaments, the finite length being approximately equal to the mean centimeter pull value of the yarn, i.e., 0.5 to 70 cm. In contra distinction to the free or unsecured filaments which are obtained from a supported ribbon employing compacted face yarns, a ribbon employing twisted face yarns will have substantially all filaments secured either to the substrate or the filament bundle.

The phrase "substantially zero twist compacted yarn" as employed herein is meant to include compacted yarns having that degree of real twist which is commonly imparted during yarn winding operations; that is to say, up to about 1/4 of a turn per inch of real twist.

The phrase "coherency factor (needle pull)" as employed herein defines coherency factor as measured by a needle pull test. The needle pull test is conducted by inserting a needle into a threadline and pulling the threadline until sufficient tension downstream of the needle builds up to trip a switch, thereby indicating an intersection of filaments. As previously mentioned, detailed description of the apparatus and the analytical procedure may be found in U.S. Pat. No. 3,566,683.

Compacted interlaced multifilament textile yarns of the type presently under discussion are set forth in U.S. Pat. No. 2,985,995. In brief, the compact interlaced multifilament textile yarns of the prior art are produced by subjecting an "as spun" substantially zero twist continuous filament bundle to the action of one or more fluid jets whereby individual filaments are randomly intermingled with adjacent filaments and groups of filaments along the length of the yarn to maintain the unity of the yarn by frictional constraint between the filaments.

A better understanding of the invention may be had from the drawings wherein.

Figure 1:
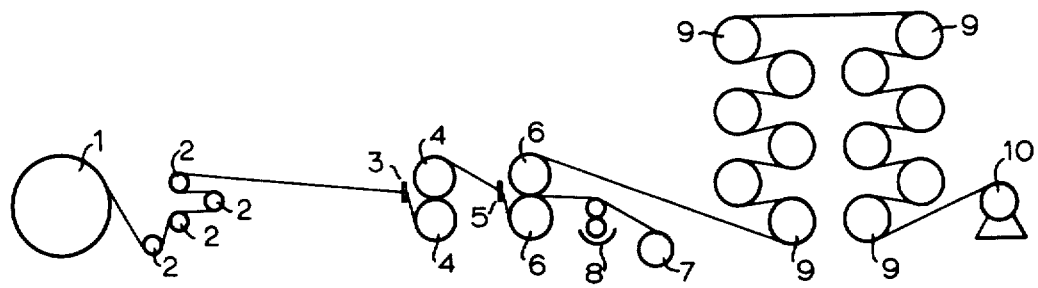
FIG. 1 is a schematic illustration of the process sequence of this invention.
Figure 2:
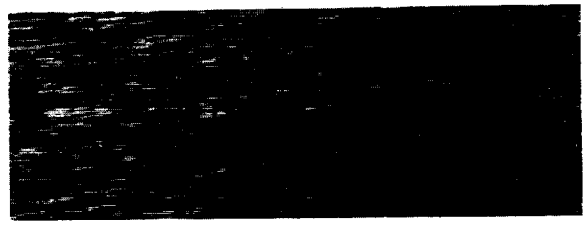
FIG. 2 is a photograph of a supported ribbon representative of the prior art.
Figure 3:
FIG. 3 is a photograph of the supported ribbon of this invention.

Turning to FIG. 1, continuous filament compacted yarns are pulled under tension from warp beam 1 through dancer roll assembly 2 through yarn guide 3, and then around a pair of dry pad rolls 4. After passage through dry pad rolls 4, the tension on all yarns is substantially equalized, and are in a parallel condition. The yarns are then passed through a second set of guides 5 and then about a wet pad roll pair 6. A substrate supply roll 7 is employed to supply a suitable base for yarns issuing from warp beam 1, the substrate being kiss coated with an adhesive composition by means of a kiss roll assembly 8. The adhesive coated substrate is then contacted with the sheet of yarn in the nip of wet pad roll combination 6. The supported yarn assembly is then passed over a plurality of drying cans 9 which are arranged in two banks and then onto a suitable take-up means 10. The ribbon produced from compacted yarns according to the aforementioned description has a bulky, or three-dimensional appearance as may be seen from the cross-sectional photograph appearing in FIG. 3 of the drawings. In contrast, supported ribbon employing yarns having real twist and more specifically, two turns per inch, has a flat or two-dimensional appearance as evidenced by FIG. 2 of the drawings which is a cross-sectional view of such a ribbon.

When cellulose ester yarns are being adhered to a cellulose ester containing substrate, the adhesive system should contain a solvent and/or plasticizer for the cellulose ester, in order to secure the fiber to the support, and an ingredient which limits the penetration of the adhesive in the fiber bundle. As a result, the ribbons produced have high pull strengths but are quite flexible.

The following specific examples of the preparation of a preferred three-dimensional ornamental ribbon are given for purposes of illustration and should not be considered as limiting the spirit or scope of this invention.

EXAMPLE I

Employing the diagrammatic apparatus as illustrated in FIG. 1, 150/40 denier cellulose acetate yarn having two turns per inch of twist, is wound on a warp beam to form a sheet having 110 ends per inch. Polytex 669 adhesive (vinylacrylic copolymer adhesive marketed by Celanese Coatings Company) is applied to one side of No. 40 kraft paper, travelling at a speed of 20 yards per minute. The coated paper and the sheet of warp yarns are then bonded together by passing through a nip roll. The resultant product, when slit into ribbons, has a flat appearance as exhibited by FIG. 2 of the drawings.

EXAMPLE II

The process of Example I is repeated except that 150/40 cellulose acetate yarns, having a needle pull test of about 60 centimeters mean compaction period when evaluated according to the apparatus and process set forth in U.S. Pat. No. 3,566,683 is employed. The resultant product, when slit into ribbons, is found to have a three-dimensional appearance due to the depth of the compacted yarn comprising the ornamental surface. The three-dimensional appearance of the ribbon of this Example may be seen in FIG. 3 of the drawings.

EXAMPLE III

The process of Example I is repeated except that 95 ends of 150/40 yarn having a needle pull test of about 60 centimeters mean compaction period is employed. The cover of the end product is found to be equal to that of Example I and hence, improved cover on the basis of yarn weight and yarn ends is obtained.

EXAMPLE IV

The diagrammatic sequence set forth in FIG. 1 of the drawings is employed, utilizing a warp beam of 200 denier cellulose acetate yarn, having a needle pull test of about 50 centimeters mean compaction period. The yarn is formed into a sheet having about 120 ends of yarn per inch. A 0.8 mil thick cellulose acetate film is coated with a mixture of 10 percent hydroxylpropyl cellulose, 45 percent dimethoxyethyl phthalate, 30 percent and 15 percent water. The sheet of yarn ends and the coated film, each travelling at speeds of about 80 meters per minute, are then bonded together by passing through a pressurized quad stand. When slit into ribbons, the product is found to have a three-dimensional appearance due to the pile-like characteristic of the compacted yarns composing the ornamental surface.

EXAMPLE V

Employing the diagrammatic apparatus as illustrated in FIG. 1, 440/32 nylon yarn compacted to 10 centimeters mean compaction period when evaulated according to the apparatus and process set forth in U.S. Pat. No. 3,566,683, is wound on a warp beam to form a sheet having 120 ends per inch, an adhesive CPE 5169 (cross-linkable acrylic latex adhesive marketed by Celanese Coatings Company) is applied to one side of a cellulose acetate film. The coated cellulose acetate film and the sheet of yarns are then bonded together by passing through a nip roll. The resultant product, when slit into ribbons, is found to have a three-dimensional appearance, due to the depth of the compacted yarn comprising the ornamental surface.

EXAMPLE VI

Employing the diagrammatic apparatus as illustrated in FIG. 1, 165/34 polypropylene yarn having a 15 centimeter mean compaction period when evaluated according to the apparatus and process set forth in U.S. Pat. no. 3,566,683, is wound on a warp beam to form a sheet having 120 ends per inch. An adhesive CPE 5271 (cross-linkable latex copolymer marketed by Celanese Coatings Company) is applied to one side of 40 weight kraft paper. The coated paper and the sheet of warp yarns running at speeds of about 20 meters per minute are then bonded together by passing through a nip roll. The resultant product, when slit into ribbons, is found to have a three-dimensional appearance, due to the depth of the compacted yarn comprising the ornamental surface.

EXAMPLE VII

Employing the diagrammatic apparatus as illustrated in FIG. 1, 150/40 rayon yarn having a needle pull test of about 10 centimeters mean compaction period when evaluated according to the apparatus and process set forth in U.S. Pat. No. 3,566,683, is wound on a warp beam to form a sheet having 130 ends per inch. Polytex 667 adhesive (vinyl-acrylic copolymer adhesive marketed by Celanese Coatings Company) is then applied to one face of a cellulose acetate film. The coated film and the sheet of warp yarn are then bonded together by passing at speeds of about 50 meters per minute through a nip roll. The resultant product, when slit into ribbons, is found to have a three-dimensional appearance due to the depth of the compacted yarn comprising the ornamental surface.

EXAMPLE VIII

Employing the diagrammatic apparatus substantially as illustrated in FIG. 1, 200 total denier cellulose acetate yarn having a 10 centimeter mean compaction period when evaluated according to the apparatus and process set forth in U.S. Pat. No. 3,566,683, is wound on a warp beam to form a sheet having 120 ends per inch. A non-woven scrim composed of 50 percent rayon staple and 50 percent cellulose acetate staple is fed from a supply beam into a pair of nip rolls, the upper member of the pair being heated to a temperature of about 540°F. The scrim and the sheet of warp yarns are then bonded together at the common point of passage through the nip roll pair, running speeds of about 30 meters being maintained. The resultant product, when slit into ribbons, is found to have a three-dimensional appearance due to the depth of the compacted yarn comprising the ornamental surface.

What is claimed is:

1. A process for the preparation of supported ribbon having improved bulk and cover, said process comprising (a) applying adhesive to a support and (b) bonding only peripheral filaments of substantially parallel, substantially zero twist compacted continuous filament yarns to said adhesive coated support whereby a continuous filament ribbon having a bulked three dimensional effect is produced.

2. The process of claim 1 wherein said continuous filament yarn is the yarn selected from the group consisting of regenerated cellulose, cellulose esters, polyester, polyamides, polypropylene, acrylics and vinyl yarns.

3. The process of claim 1 wherein said compacted continuous filament yarn has a mean centimeter needle pull of from 0.5 centimeter to 70 centimeters.

* * * * *